United States Patent
Blake et al.

(10) Patent No.: US 8,258,447 B2
(45) Date of Patent: Sep. 4, 2012

(54) METHODS AND APPARATUS FOR A FRANGIBLE SEAL FOR DEPLOYABLE FLIGHT STRUCTURES

(75) Inventors: Alexandra L. Blake, Tucson, AZ (US);
David B. Hatfield, Oracle, AZ (US);
Rudy A. Eisentraut, Tucson, AZ (US);
Peter J. Drake, Saint David, AZ (US)

(73) Assignee: Raytheon Company, Waltham, MA (US)

( * ) Notice: Subject to any disclaimer, the term of this patent is extended or adjusted under 35 U.S.C. 154(b) by 324 days.

(21) Appl. No.: 12/628,610

(22) Filed: Dec. 1, 2009

(65) Prior Publication Data

US 2011/0073709 A1    Mar. 31, 2011

Related U.S. Application Data

(60) Provisional application No. 61/247,452, filed on Sep. 30, 2009.

(51) Int. Cl.
*F42B 15/01*    (2006.01)

(52) U.S. Cl. ...... 244/3.26; 244/3.24; 244/46; 244/172.6

(58) Field of Classification Search ............... 244/129.4, 244/3.26, 172.6, 3.24, 130, 3.25, 46; 89/1.81, 89/1.817, 1.816; 277/652, 654, 917
See application file for complete search history.

(56) References Cited

U.S. PATENT DOCUMENTS

| | | | | |
|---|---|---|---|---|
| 3,356,317 A | * | 12/1967 | Bird | 244/46 |
| 3,480,237 A | * | 11/1969 | Appleby | 244/46 |
| 3,633,846 A | * | 1/1972 | Biggs, Jr. | 244/3.27 |
| 3,669,367 A | * | 6/1972 | Rhodes et al. | 244/46 |
| 3,797,784 A | * | 3/1974 | Muller | 244/46 |
| 3,917,194 A | * | 11/1975 | Muller | 244/46 |
| 3,987,985 A | * | 10/1976 | Muller | 244/46 |
| 4,029,272 A | * | 6/1977 | Broadhurst | 244/46 |
| 4,485,993 A | * | 12/1984 | Mueller | 244/135 B |
| 6,487,952 B1 | * | 12/2002 | Borgwarth et al. | 89/1.81 |
| 6,752,060 B1 | * | 6/2004 | Griffin | 89/1.817 |
| 6,869,666 B2 | | 3/2005 | Deeb et al. | |
| 2002/0170419 A1 | * | 11/2002 | Borgwarth et al. | 89/1.81 |
| 2003/0000371 A1 | * | 1/2003 | Ciappi | 89/1.817 |

* cited by examiner

*Primary Examiner* — Philip J Bonzell
(74) *Attorney, Agent, or Firm* — Renner, Otto, Boisselle & Sklar, LLP

(57) ABSTRACT

A frangible seal includes a first region penetratable by a deployable structure configured to selectably extend through an opening in a housing and extend beyond an outer surface of the housing, and a second region configured to adhere to a portion of the outer surface of the housing surrounding the opening. The first region and the second region includes a polymer layer having a metalized surface (e.g., aluminized polyimide) and a non-metalized surface, and an ablative coating provided on the metalized surface of the polymer layer.

20 Claims, 2 Drawing Sheets

METHODS AND APPARATUS FOR A FRANGIBLE SEAL FOR DEPLOYABLE FLIGHT STRUCTURES

CROSS-REFERENCE TO RELATED APPLICATIONS

The present application claims priority to U.S. Prov. Pat. No. 61/247,452, filed Sep. 30, 2009, which is hereby incorporated by reference.

TECHNICAL FIELD

The present invention generally relates to deployable flight surfaces and other such structures, and more particularly relates to systems for protecting such structures and other internal components from an external environment.

BACKGROUND

Deployable flight surfaces are often used in connection with missiles, rockets, and other such aeronautical structures. In general, these flight surfaces, which may include various fins, canards, and the like, are configured to extend from the external skin or housing of the structure a predetermined time after being launched.

It is desirable for the flight surface, the control system for deploying the flight surface, and any associated electronics to be protected from various environmental and other effects, such as moisture, particles, heat, etc. This is particularly the case in applications where multiple rockets are fired adjacent to each other, and where hot plume gases and associated heat and particles impinge on neighboring structures.

Currently known methods of protecting such deployable structures are undesirable in a number of respects. While it would be advantageous to cover any deployable surface openings with some form of seal, currently known seals are unable to provide sufficient protection while at the same time being frangible enough to allow a deployable surface to extend therethrough.

Accordingly, there is a need for improved methods of sealing and protecting deployable flight surfaces. Other desirable features and characteristics of the present invention will become apparent from the subsequent detailed description and the appended claims, taken in conjunction with the accompanying drawings and the foregoing technical field and background.

BRIEF SUMMARY

A frangible seal in accordance with one embodiment generally includes a first region penetratable by a deployable structure configured to selectably extend through an opening in a housing and extend beyond an outer surface of the housing, and a second region configured to adhere to a portion of the outer surface of the housing surrounding the opening. The first region and the second region may include a polymer layer having a metalized surface (e.g., aluminized polyimide), while an ablative coating is provided on the metalized surface of the polymer layer.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to flight surfaces, aeronautical structures, polymers, and the like, need not be described herein.

In general, a frangible seal in accordance with one embodiment includes two regions: a first region penetratable by a deployable structure configured to selectably extend through an opening in a housing and extend beyond an outer surface of the housing, and a second region configured to adhere to a portion of the outer surface of the housing surrounding the opening.

Figure 1:
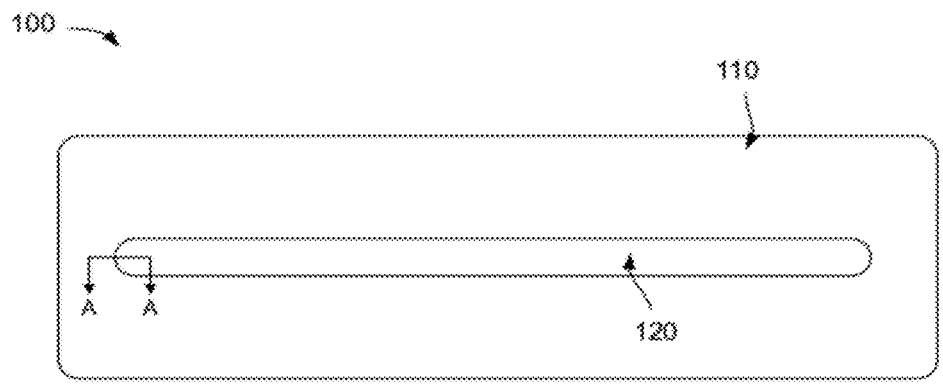
FIG. 1 depicts a top view of a frangible seal in accordance with one embodiment.

Referring now to FIG. 1, a frangible seal 100 (shown in a top view) generally includes an adhesive region 110 and a frangible region 120. The shape, size, and scale of the embodiment shown in FIG. 1 is merely an example and does not limit the range of embodiments encompassed by the present invention. Adhesive region no and frangible region 120 may have any curvilinear shape and may contain multiple such regions. While adhesive region 110 is shown entirely surrounding frangible region 120, the invention is not so limited.

In general, frangible region 120 is configured to protect internal components within a structure from various environmental conditions and other damage, while adhesive region 110 is configured to allow seal 100 to be attached to the outer surface of the structure, and may also provides some structural support for the frangible region 120. The environmental factors and other damage being protected against may vary depending upon the specific application, but in various embodiments include such things as moisture, electromagnetic interference, heat, particles, dust, aging effects, handling damage, altitude (pressure) effects, rain, hail, snow, radiative energy (light, infrared, UV, etc.), and any other potentially deleterious aspect of the external and internal environments.

Figure 3:
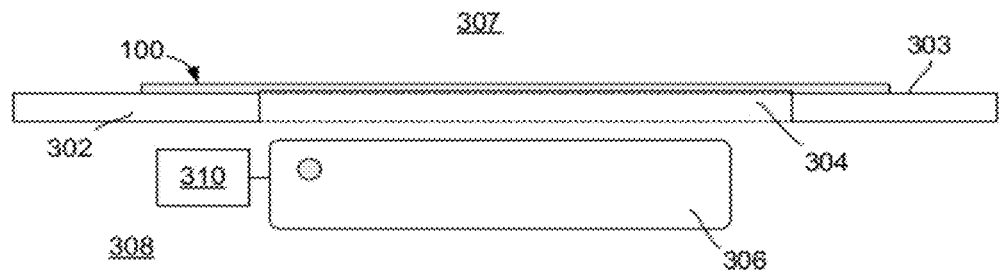
FIGS. 3 and 4 depict the deployment of a structure through a frangible seal in accordance with one embodiment.

More particularly, referring to FIG. 3, a housing 302 (e.g., for an airframe, missile, or the like) includes an opening 304 through which a structure 306 is configured to deploy. A control activation system 310, including any suitable combination of electronics and electromechanical devices, is coupled to deployable structure 306.

Seal 100 is placed on the external surface 303 of housing 302 such that the frangible region (120 in FIG. 1) is substantially covering opening 304, and the adhesive region (120 in FIG. 1) is substantially adhered to (or is otherwise restrained on) an area outside of opening 304 (e.g., the perimeter of opening 304). As shown, seal 100 thus provides a barrier between an external environment 307 and an internal environment 308.

Figure 4:
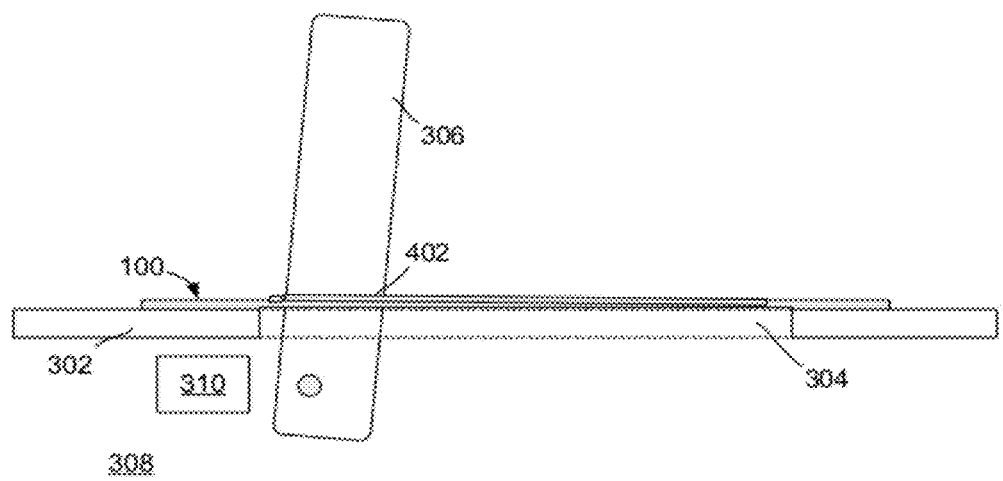

As shown in FIG. 4, when structure 306 is deployed, it penetrates, rips through, punctures, or otherwise extends through the all or a portion of the frangible region of seal 100, as shown at reference number 402, so that it may function for its intended purpose. Thus, the structure and geometry of frangible seal 120 and adhesive region 110 are selected to provide sufficient protection while at the same time being sufficiently frangible so that structure 306 is capable of penetrating therethrough.

Figure 2:
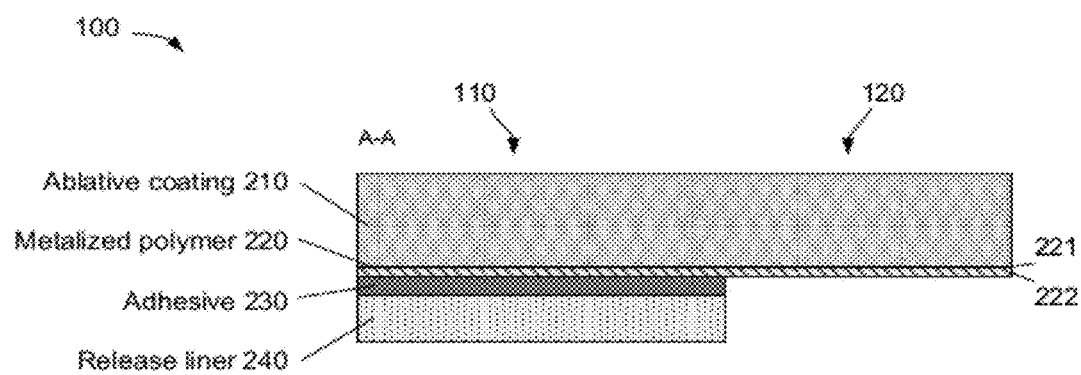
FIG. 2 is a cross-sectional view of section A-A of FIG. 1.

Accordingly, FIG. 2 depicts a cross-section through A-A of FIG. 1 in accordance with a particular embodiment. As shown seal 100 includes an ablative coating layer 210, a metalized polymer layer 220, an adhesive layer 230, and a release liner 240 (which is removed to expose adhesive layer 230). The frangible region 120 thus includes only the ablative coating 210 and metalized polymer 220.

The materials and thicknesses selected for ablative coating 210 and metalized polymer 220 are preferably such that they provide protection from thermal, structural, and other environmental factors while providing a relatively stable (but frangible) structure.

In one embodiment, metalized polymer 220 is a polyimide film 222 aluminized on one side 221 (i.e., the side adjacent ablative coating 210) with a thickness of about 80-120 nm, e.g., about 100 nm. Other metalized polymers or similar structures may be used, however. The thickness of this layer is preferably selected to achieve the objectives stated above.

Further in accordance with an example embodiment, ablative coating 210 comprises an RTV (room temperature vulcanization) material, such as Dow Corning 3-6077 RTV applied to the metalized side of layer 220. However, any suitable ablative material and cure method may be employed. In one embodiment, coating 210 is approximately 0.0050 to 0.0100 inches, e.g., about 0.0065 inches.

Adhesive layer 230 comprises any of the various pressure sensitive adhesives known in the art, and is applied to the polymer side of metalized polymer 220. In one embodiment, adhesive layer 230 is about 0.0020 inches thick, but may vary depending upon the various design factors. In alternate embodiments, other fastening schemes such as spring clips and the like are used in conjunction with a layer 230 that is elastomeric, but not necessarily adhesive.

The particular materials and thicknesses described above are merely one embodiment. Any number of materials and layers may be used in various alternate embodiments. In general, ablative coating 210 is a thermal protection layer that also provides structural integrity for the seal. The metalized polymer 220 is also structural, and at the same time provides a relatively low-friction surface for the impinging flight surface during deployment. Metalized polymer 220 further provides an environmental barrier, e.g., against moisture, particles, etc.

In general, then, the present invention encompasses a frangible region that uses two or more layers to provide sufficient structural integrity while protecting against thermal and other environmental factors. Stated another way, frangible region 120 includes a thermal barrier system (e.g., ablative coating 210) and an environmental barrier system (e.g., metalized polymer 220).

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. An aeronautical vehicle comprising:
   a housing having an outer surface and an opening extending therethrough;
   a deployable structure disposed within the housing and configured to selectably extend through the opening; and
   a frangible seal positioned over the opening, the frangible seal having a first region penetratable by the deployable structure; and a second region configured to be restrained on a portion of the outer surface of the housing surrounding the opening;
   wherein the housing is a missile housing, and the deployable structure is a control surface.

2. An aeronautical vehicle comprising:
   a housing having an outer surface and an opening extending therethrough;
   a deployable structure disposed within the housing and configured to selectably extend through the opening;
   a frangible seal positioned over the opening, the frangible seal having a first region penetratable by the deployable structure; and a second region configured to be restrained on a portion of the outer surface of the housing surrounding the opening;
   wherein when the deployable structure is deployed, the deployable structure punctures the first region; and
   wherein, after the deployable structure is deployed, the deployable structure remains mechanically coupled to the housing.

3. The aeronautical vehicle of claim 2, wherein the frangible seal includes a thermal barrier.

4. The aeronautical vehicle of claim 2, wherein extension of the deployable structure causes the deployable structure to extend through an opening in the housing, beyond an outer surface of the housing.

5. The aeronautical vehicle of claim 2, wherein the frangible seal includes an ablative coating, farthest from the housing.

6. An aeronautical vehicle comprising:
   a housing having an outer surface and an opening extending therethrough;
   a deployable structure disposed within the housing and configured to selectably extend through the opening; and
   a frangible seal positioned over the opening, the frangible seal having a first region penetratable by the deployable structure; and a second region configured to be restrained on a portion of the outer surface of the housing surrounding the opening;
   wherein:
      the first region and the second region each include a polymer layer having a metalized surface and a non-metalized surface and an ablative coating provided on the metalized surface of the polymer layer; and
      the second region includes an adhesive layer provided on the non-metalized surface of the polymer layer and is configured to adhere to the outer surface of the housing.

7. The aeronautical vehicle of claim 6, wherein the polymer layer includes polyimide, and the metalized surface is an aluminized surface.

8. The aeronautical vehicle of claim 6, wherein the polymer layer includes polyimide.

9. The aeronautical vehicle of claim 6, wherein the metalized surface is an aluminized surface.

10. The aeronautical vehicle of claim 6, wherein the polymer layer is between approximately 80 and 120 nm.

11. The aeronautical vehicle of claim 6, wherein the ablative material is a silicone ablative material.

12. The aeronautical vehicle of claim 6, further comprising an ablative coating provided on the metalized surface of the polymer layer.

13. The aeronautical vehicle of claim 12, wherein the ablative coating is a room temperature vulcanization material.

14. The aeronautical vehicle of claim 13, wherein the ablative coating has a thickness of between approximately 0.050 to 0.100 inches.

15. The aeronautical vehicle of claim 12, wherein the deployable structure is a flight surface.

16. The aeronautical vehicle of claim 15, wherein the housing is a missile housing.

17. The aeronautical vehicle of claim 15, wherein the flight surface is a fin.

18. The aeronautical vehicle of claim 15, wherein the flight surface is a canard.

19. The aeronautical vehicle of claim 15, wherein the frangible seal is an external skin on the housing.

20. The aeronautical vehicle of claim 15, wherein the ablative material is a silicone ablative material.

* * * * *